United States Patent

Suzuki et al.

[11] Patent Number: 6,089,294
[45] Date of Patent: Jul. 18, 2000

[54] RUBBER ELEMENT FOR TIRE AND METHOD OF MANUFACTURING THE SAME

[75] Inventors: Kazuya Suzuki, Shirakawa; Nagayoshi Jumonji, Taishinmura, both of Japan

[73] Assignee: Sumitomo Rubber Industries, Ltd., Hyogo, Japan

[21] Appl. No.: 09/084,286

[22] Filed: May 26, 1998

[30] Foreign Application Priority Data

Jun. 13, 1997 [JP] Japan .................................. 9-173216

[51] Int. Cl.⁷ .......................... B60C 15/06; B29D 30/48
[52] U.S. Cl. ....................... 152/541; 152/546; 152/547; 156/136
[58] Field of Search .................... 152/541, 542, 152/546, 547; 156/135, 136, 131, 132, 422, 460, 398, 130.7

[56] References Cited

U.S. PATENT DOCUMENTS

| 1,944,768 | 1/1934 | Stevens | 156/136 |
| 2,000,869 | 5/1935 | Taylor | 152/547 |
| 2,971,553 | 2/1961 | Woodall | 152/541 |
| 4,196,036 | 4/1980 | Allen et al. | 156/422 |
| 4,321,957 | 3/1982 | Hahn et al. | 156/136 |
| 5,203,938 | 4/1993 | Moody et al. | 156/136 |

*Primary Examiner*—Geoffrey L. Knable

[57] ABSTRACT

A rubber element for tire comprising a bead core which is generally an annular shape, and an apex which is generally an annular shape and attached to the bead core. The apex comprises a first portion whose sectional configuration is generally a rectangle, and a second portion whose sectional configuration is generally a semiellipse and integrally molded on an outer face of the first portion. An inner face of the first portion of the apex is attached to an outer face of the bead core, whereby the apex and the bead core are united.

5 Claims, 5 Drawing Sheets

6,089,294

RUBBER ELEMENT FOR TIRE AND METHOD OF MANUFACTURING THE SAME

BACKGROUND OF THE INVENTION

1. Field of the Invention

This invention relates to a rubber element for tire and a method of manufacturing the same.

2. Description of the Related Art

Among all sorts of elements composing a tire, there is a rubber element for tire comprising a bead core and an apex attached to the bead core. There are conventionally known a rubber element 113 for tire comprising a bead core 101 and an apex 102 whose cross sectional configuration is generally a triangle and attached to the bead core 101 as shown in FIG. 5A, and a rubber element 113 for tire comprising the bead core 101 and an apex (which is called as a bead filler or a stiffener) 103 whose cross sectional configuration is generally a trapezoid and attached to the bead core 101 as shown in FIG. 6.

When forming a tire, a seat-like member 112 comprising layers of an inner and a ply is attached on a former 104 and setting the rubber element 113 for tire on the seat-like member 112, and then the apex 102 is needed to be bent down, i.e. the apex 102 is needed to be made along with the former 104 as shown in FIG. 5B. To bend the apex 102 on its side, the apex 102 is needed to be pressed down with relatively a high pressure by, for example, a stitcher, and this process is bothersome. Moreover because of the pressure applied to the apex (in the processes shown in the FIGS. 5B and 5C), there is a possibility that a joining face 110 between the bead core 101 and the apex 102 is 'cracked (separated)', and air stays in the crack (separation), and a defective tire may be thereby manufactured. Moreover the apex 102 which is once bent down to the former as shown in FIG. 5C may start to rise up (spring up) by elastic restoring force thereof, and a 'partial rising' on the sheet-like member 112 is possible to be caused. The apex 103 of the rubber element for tire shown in FIG. 6 is not needed to be bent down to the former in the processes of manufacturing a tire, however an inclined side face 111 of the apex 103 does not fit to the sheet-like member 112 such as a ply, and the apex 103 and the bead core 101 to which the apex 103 is attached slip down from once fixed position on the sheet-like member 112.

To manufacture a rubber element 113 shown in FIG. 6, processes as follows are required. First a sheet-like rubber material 105 is formed as shown in FIG. 7, then cutting the rubber material 105 and forming the apex 103 whose cross sectional configuration is generally a trapezoid, and attaching the apex 103 to the bead core 101. The manufacturing method of such rubber element requires the bothersome operations above, and by manufacturing the rubber element by the conventional method, some parts of the material are left unused and are wasted.

An apex whose sectional configuration is generally a trapezoid is molded by an extrusion machine in some cases, however, a rubber extruded from a die plate of the extrusion machine is twisted and the rubber is not possible to be straighten.

It is therefore an object of the present invention to provide a rubber element for tire which an operation of bending down an apex of the rubber element is not needed when molding a tire, and an inferiority in adhesion of the apex to a sheet-like member is not caused after setting the rubber element for tire, i.e. the rubber element for tire which is possible to increase productivity of tires and to prevent manufacturing defective tires. It is another object of the present invention to provide a simple and sure method of manufacturing the rubber element for tire.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1A:
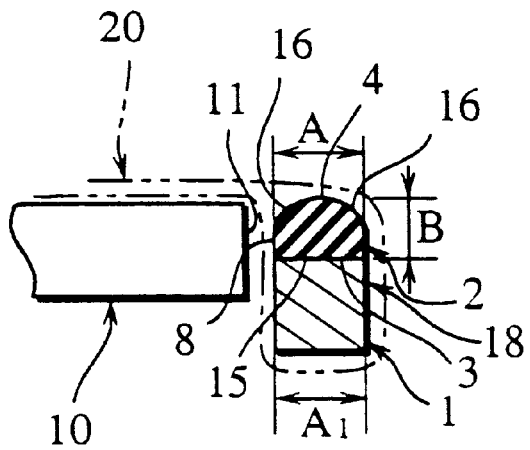
FIG. 1A is a schematic sectional view of a rubber element for tire according to the present invention.

FIG. 1A shows a rubber element 18 for tire according to the present invention which comprises a bead core 1 and an apex 2 (which can be called as a bead filler or a stiffener) attached to the bead core 1.

Figure 1B:
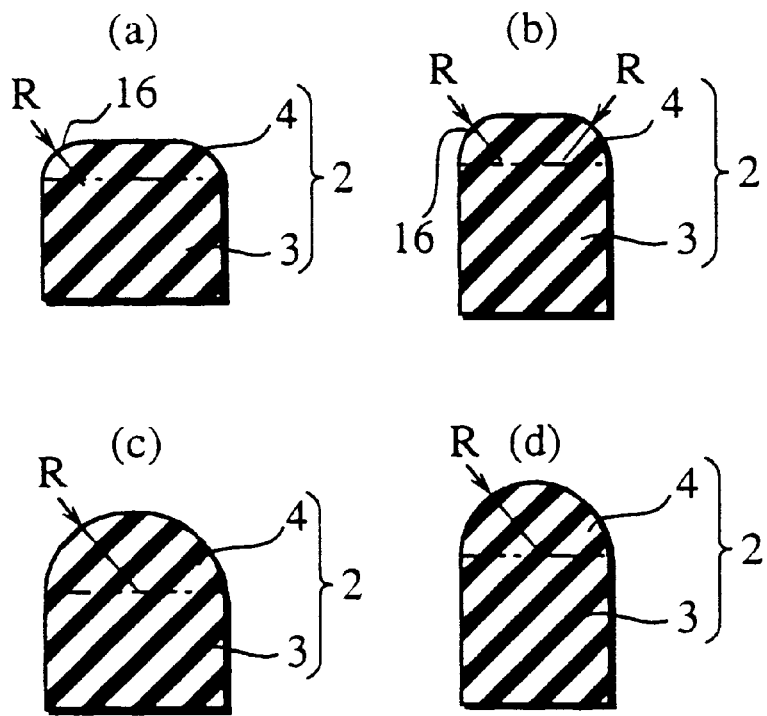
FIG. 1B is an explanatory view of sectional configurations of apexes.

The apex 2 of this invention has a cross sectional configuration which is generally a rectangle whose two corners on outer circumference of the apex are rounded off i.e. generally D shaped in cross section. Specifically in the embodiments shown in FIG. 1A and FIG. 1B(*a*), the apex 2 comprises a first portion 3 whose cross sectional configuration is generally a rectangle, and a second portion 4 whose cross sectional configuration is generally a semiellipse (which is divided by a major axis of an ellipse) and integrally molded on an outer circumference of the first portion 3, and both of side faces of the apex 2 are planes which are parallel. In another embodiment of the apex shown in FIG. 1B(*b*), the apex has a cross sectional configuration which a combination of a first portion 3 whose cross sectional configuration is generally a square and a second portion 4 whose cross sectional configuration is generally a semiellipse. In a further embodiment of the apex shown in FIG. 1B(*c*), the apex has a cross sectional configuration which a combination of a first portion 3 whose cross sectional configuration is generally a rectangle and a second portion 4 whose cross sectional configuration is generally a semicircle. In still another embodiment of the apex shown in FIG. 1B(*d*), the apex may have a cross sectional configuration which a combination of a first portion 3 whose cross sectional configuration is generally a square and a second portion 4 whose cross sectional configuration is generally a semicircle. A rubber hardness of this apex 2 is arranged to be JIS (Japanese Industrial Standard) A 83° to 98°. Regarding dimensions of the apex 2 in section, if a length of a base of the apex 2, i.e. an axial length of an inner face 15 (which corresponds to an axial length $A_1$ of the bead core 1) is expressed by 'A', a height (radial length) of the apex is expressed by 'B' and a radius of curvature of each curved portions 16 of the apex is expressed by 'R', A=5 mm, B=8 mm, R=2.5 mm, for example.

Next, explained below is a method of manufacturing a rubber element for tire.

Figure 2:
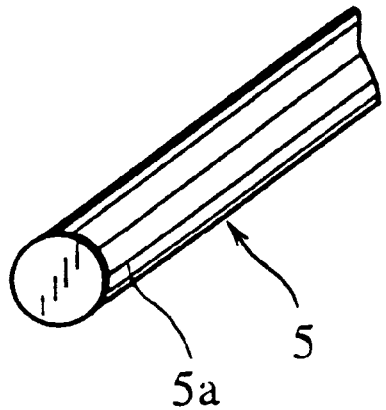
FIG. 2 is a perspective view of a linear rubber body for forming an apex.
Figure 3:
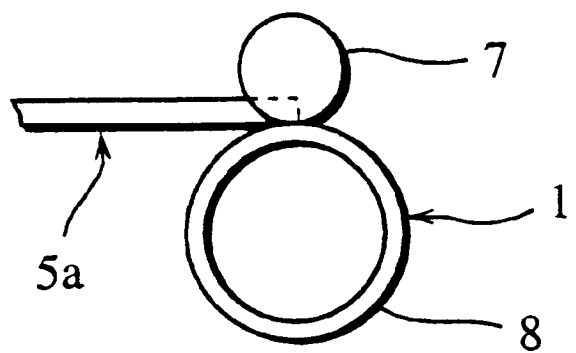
FIG. 3 is a schematic view of a method of manufacturing the rubber element for tire according to the present invention.

First, as shown in FIG. 2, a linear body 5 whose sectional configuration is a circle and made of rubber is formed by extrusion molding, and by cutting the linear body 5 to a predetermined length, the liner rubber body 5a of the predetermined length is formed. After that, the linear rubber body 5a of the predetermined length is attached to the bead core 1 which is in a ring shape as shown in FIG. 3.

Figure 4A:
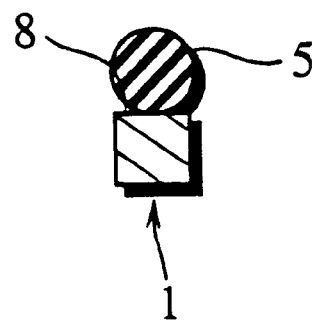
FIG. 4A is a process view of the method of manufacturing the rubber element for tire.
Figure 4B:
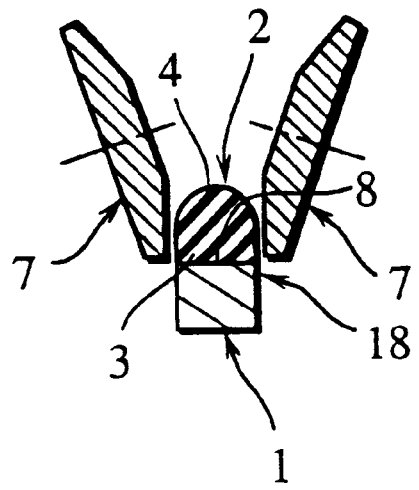
FIG. 4B is a process view of the method of manufacturing the rubber element for tire.

That is to say, while putting the linear rubber body 5a between a pair of fitting rollers 7 and holding the linear rubber body 5a with the fitting rollers 7, by pressing the linear rubber body 5a onto an outer circumferential face 8 of the bead core 1 and by rotating the bead core 1, the linear rubber body 5a shown as 5 in FIG. 4A is shaped into the apex 2 having a configuration illustrated in FIG. 4B (which is generally a rectangular configuration in cross section whose two corners on outer circumference of the apex are rounded off) and attached to the bead core 1. That is to say the inner face 15 of the first portion 3 of the apex 2 is attached to the outer circumferential face 8 of the bead core 1.

The rubber element 18 for tire manufactured by the method described above is assembled to a sheet-like member 20, indicated in Figures by alternate long and two short dashes lines and comprising layers of an inner and a ply, by a former 10 (see FIG. 1A). That is to say, the sheet-like member 20 is attached on the former 10 and setting the rubber element 18 for tire on the sheet-like member 20, then the rubber element 18 for tire and the sheet-like member 20 are 'turned up'.

The side face of the apex 2, i.e. the side face of the first portion 3 is not inclined toward an end face 11 of the former 10, thereby the ply (sheet-like member 20) is prevented from 'partial rising', and an inferiority in adhesion of the apex to the sheet-like member is not caused. Consequently a bead portion of a tire formed with the rubber element for tire can be assembled to a rim so that the bead portion and the rim form a full circular configuration, thereby RFV (Radial Force Variation) of the tire can be decreased. As dimensions of the apex 2 are arranged as the example described above, i.e. A=5 mm, B=8 mm, R=2.5 mm, an inferiority in adhesion of the apex to the sheet-like member is not caused.

Figure 5A:
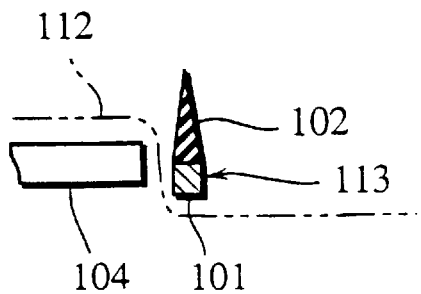
FIG. 5A is a schematic sectional view of a conventional rubber element for tire.
Figure 5B:
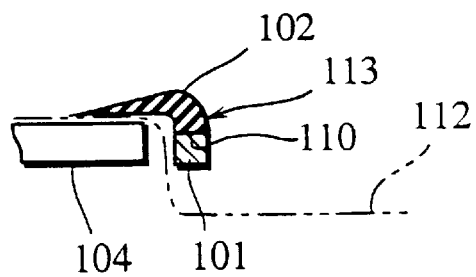
FIG. 5B is a schematic sectional view of the conventional rubber element for tire.
Figure 5C:
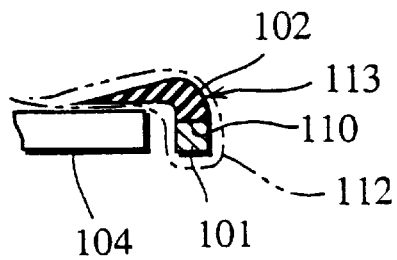
FIG. 5C is a schematic sectional view of the conventional rubber element for tire.
Figure 6:
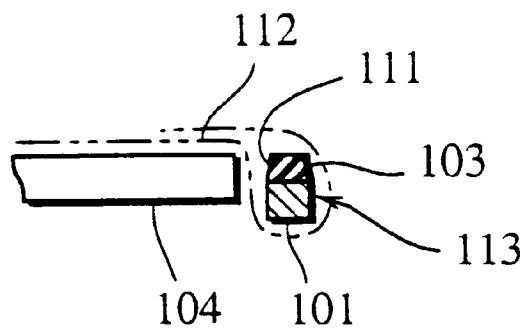
FIG. 6 is a schematic sectional view of another conventional rubber element for tire.
Figure 7:
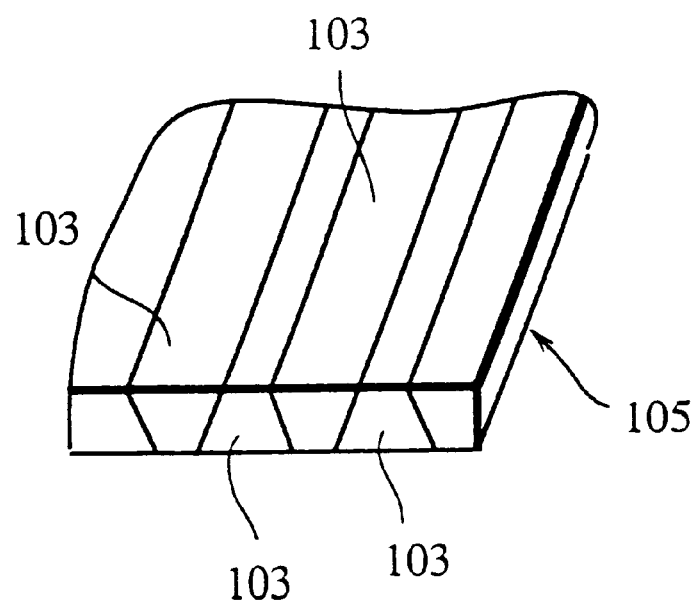
FIG. 7 is an explanatory view of the method of manufacturing the rubber element for tire illustrated in FIG. 6.

When forming a tire, the apex of the present invention is not needed to be bent down, while the each apex 102 shown in FIGS. 5A to 5C whose sectional configuration is generally a triangular configuration needed to be bent down. Thereby a pressure which is required to bend down the apex is not needed when molding a tire with the rubber element for tire of the present invention, and 'crack (separation)' is not caused between the bead core 1 and the apex 2.

Because the linear body 5 to form the linear rubber body 5a is a rubber product whose sectional configuration is a circle (which is an identical configuration with a screw for extrusion), the linear rubber body 5a of high quality can be manufactured even if the linear body 5 which is extruded is twisted. Moreover the apex 2 is a rubber having a hardness of JIS A 83° to 98° and the apex shows great strength.

Next, rubber elements 113 for tire having apexes 102, each of which is generally a triangular configuration in section as shown in FIGS. 5A to 5C, were manufactured as Conventional Product 1, rubber elements 113 for tire having apexes 103, each of which is generally a trapezoid configuration in section were manufactured as Conventional Product 2, and rubber elements 18 for tire having apexes 2, each of which has a sectional configuration illustrated in FIG. 1A were manufactured as Product (Example) of the present invention, and tires are manufactured with the respective rubber elements. The results of manufacturing tires are shown in Table 1. The size of the rubber elements for tires is 145R12, and 100 pieces of rubber elements for tires were respectively manufactured as the Conventional Products 1, the Conventional Products 2, and the Products of the Present Invention.

TABLE 1

|  | Conventional Product 1 | Conventional Product 2 | Product of the Present invention |
| --- | --- | --- | --- |
| Manufacturing Rate of Defective Products (%) | 5 | 7 | 0 |
| Productivity Index | 100 | 80 | 70 |

In the results in Table 1 of manufacturing rate of defective products, when tires were manufactured with the conventional products 1, tires having sheet-like members 112 which were creased or partially risen in the process of bending down the apexes of the conventional product 1 by partial spring back of the apexes, were sorted out as the defective products. In the results in Table 1 of manufacturing rate of defective products when tires were manufactured with the conventional products 2, sheet-like members 112 of the tires which were partially risen were sorted out as the defective products. It is apparent from the Table 1 that no defective products were manufactured when tires were manufactured with the products of the present invention. However in the case of manufacturing tires with conventional products 1, 5% of the entire tires manufactured were defective products, and in the case of manufacturing tires with conventional products 2, 7% of the entire tires manufactured were defective products.

Each result of 'Productivity Index' shows a time expressed in percentage which is required to form a tire when manufacturing a tire with a conventional product 2 or a product of the present invention as arranging a time of manufacturing a tire with a conventional product 1 to be '100'. In the case of manufacturing a tire with a conventional product 1, an apex-down process and a ply-stitch process (a process to release remained air generated in the process of assembling an element to a ply, and the process to stitch a ply by a ply-stitcher) are required. In a case of manufacturing a tire using a conventional product 2, a ply-stitch process is required, and in a case of manufacturing a tire using a product of the present invention, neither apex-down process nor a ply-stitch process are required. As the productivity index of the case of manufacturing a tire with the conventional product 1 is arranged to be '100', in the case of manufacturing a tire with a conventional product 2, a tire is manufactured in 80% of the time required to manufacture a tire with the conventional product 1. In the case of manufacturing a tire with a product of the present invention, a tire is manufactured in 70% of the time required to manufacture a tire with the conventional product 1. These results show that a tire is possible to be manufactured in a short time when the tire is manufactured with the product of the present invention.

The rubber element for tire according to the present invention can omit a process to lay down an apex when manufacturing a tire with the rubber element of the present invention (while the conventional case using the apex whose sectional configuration is generally a triangle needs to be bent down). As a result, a whole manufacturing process time can be shortened.

In a tire which is formed with a rubber element for tire according to the present invention, an inferiority in adhesion of an apex to a sheet-like member is not caused, and a bead portion with the rubber element for tire can be assembled to a rim so that the bead portion and the rim form a full circle configuration, thereby RFV (Radial Force Variation) of the tire can be decreased.

In the tire which is formed with a rubber element for tire according to the present invention, a process to bend down an apex is omitted and 'a crack (separation)' will not be caused often on the joining face between the bead core 1 and the apex 2, and defective tires which will be manufactured can be decreased.

In the tire which is formed with a rubber element for tire according to the present invention, hardness of an apex 2 is adequate and an inferiority in adhesion of an apex to a sheet-like member can be prevented from occurring.

According to the present invention, a rubber element for tire which increases productivity of tires, and which is surely prevented from producing defective tires, can be easily manufactured with accuracy.

While preferred embodiments of the present invention have been described in this specification, it is to be understood that the invention is illustrative and not restrictive, because various changes are possible within the spirit and indispensable features.

What is claimed is:

1. A bead assembly for a tire which possesses a bead core and a rubber apex whose inner face is attached to an outer circumferential face of said bead core, wherein the improvement comprises:

said apex having a cross sectional configuration which is substantially rectangular and whose two corners on an outer circumference of said apex are rounded off, said apex in cross section having two corners on an inner circumference, which are angular.

2. A bead assembly for a tire which possesses a bead core and a rubber apex attached to said bead core, wherein the improvement comprises:

said apex comprising a first portion whose cross sectional configuration is substantially rectangular, and a second portion whose cross sectional configuration is semielliptical, and integrally molded on an outer circumference of said first portion, and having an inner face of said first portion of said apex attached to an outer circumferential face of said bead core, said apex in cross section having two corners on an inner circumference, which are angular.

3. A bead assembly for a tire which possesses a bead core and a rubber apex attached to said bead core, wherein the improvement comprises:

said apex comprising a first portion whose cross sectional configuration is substantially rectangular, and a second portion whose cross sectional configuration is semicircular and integrally molded on an outer circumference of said first portion, and having an inner face of said first portion of said apex attached to an outer circumferential face of said bead core, said apex in cross section having two corners on an inner circumference which are angular, said apex having a radius of curvature of curved portions of one-half of the length of the base of said apex.

4. A bead assembly for a tire as set forth in claim 1, wherein a rubber hardness of said apex is selected to be JIS A 83° to 98°.

5. A method of manufacturing a bead assembly for a tire, comprising the steps of:

molding a linear rubber body of predetermined length for forming an apex having a circular configuration in section;

pressing said linear rubber body by fitting rollers to form said apex comprising a first portion whose cross sectional configuration is substantially rectangular, and a second portion whose cross section configuration is semicircular and integrally molded on an outer circumference of said first portion, said apex in cross section having two corners on an inner circumference which are angular; and attaching said apex to a bead core.

* * * * *